Dec. 18, 1923. 1,478,179
F. F. EVERMANN
LIVE BAIT BOX
Filed March 1, 1922 2 Sheets-Sheet 1
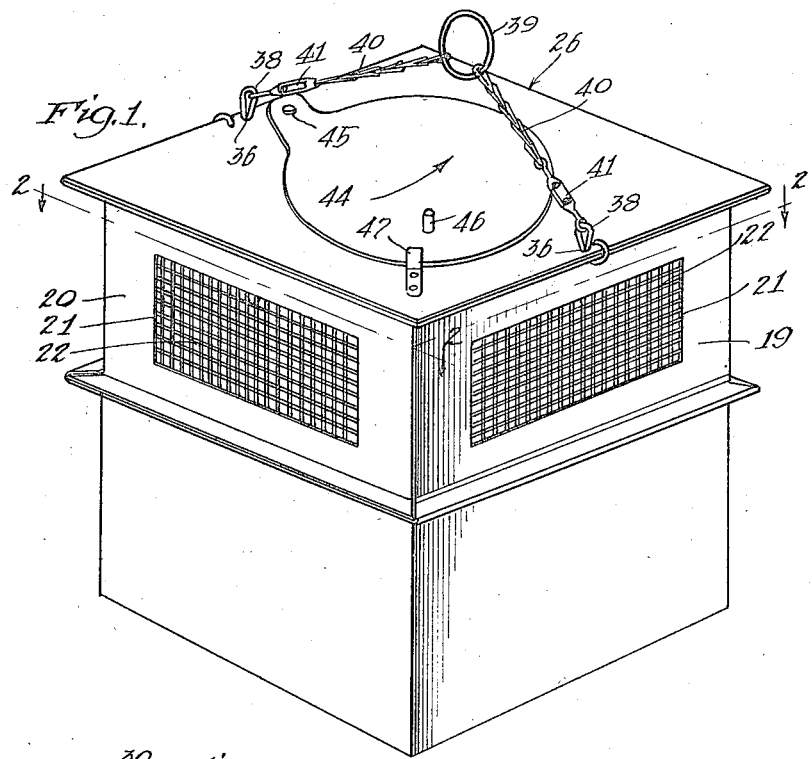
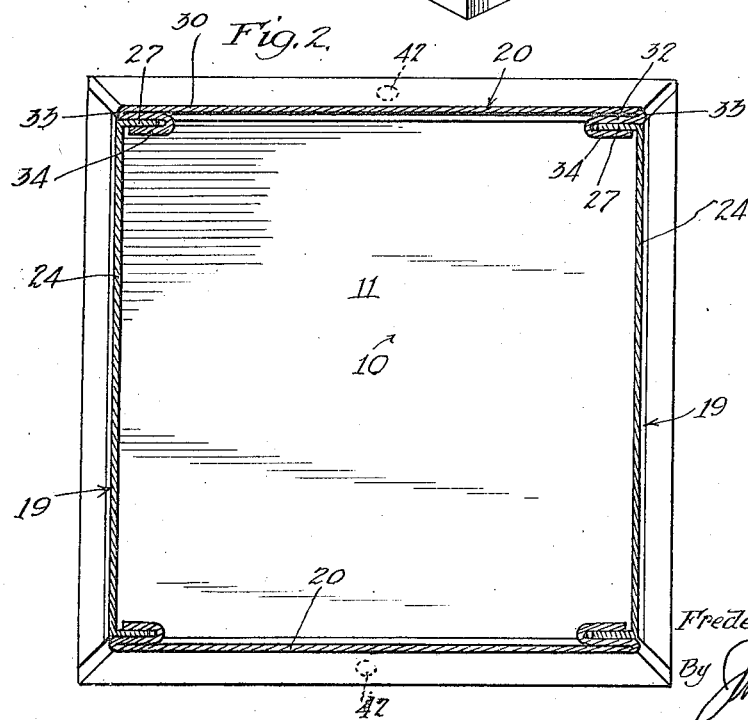

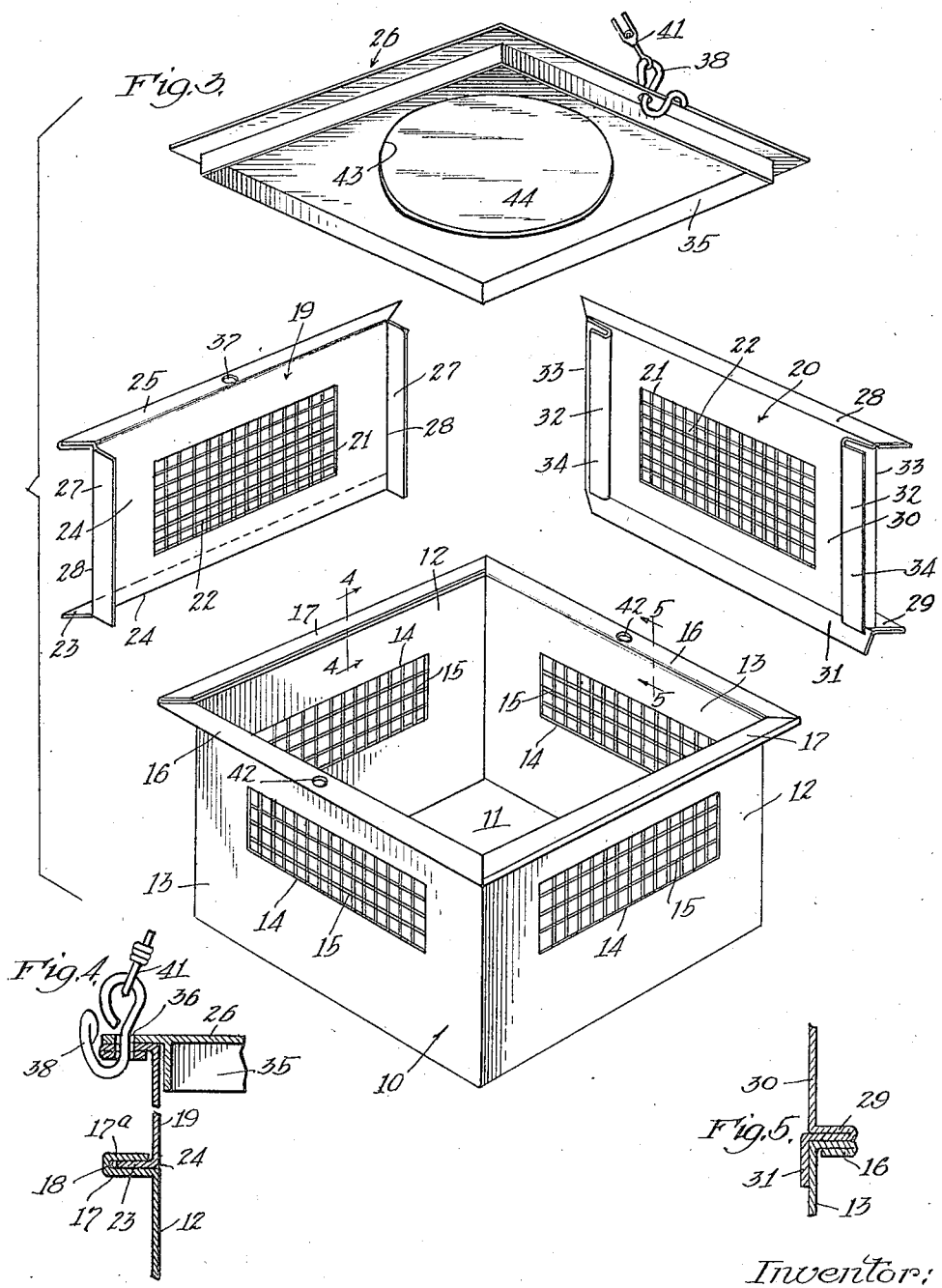

Patented Dec. 18, 1923.

1,478,179

UNITED STATES PATENT OFFICE.

FREDERICK F. EVERMANN, OF LOS ANGELES, CALIFORNIA.

LIVE-BAIT BOX.

Application filed March 1, 1922. Serial No. 540,092.

*To all whom it may concern:*

Be it known that I, FREDERICK F. EVERMANN, a citizen of the United States, and a resident of the city of Los Angeles, county of Los Angeles, and State of California, have invented new and useful Improvements in Live-Bait Boxes, of which the following is a full, clear, and exact disclosure.

My invention, hereinafter disclosed in its preferred specific embodiment, relates to bait boxes; and particularly to boxes adapted to contain live bait, and be suspended in water for the purpose of keeping the bait alive and in fresh condition.

The invention as herein disclosed is characterized by two salient features, i. e., (a) a box constructed of sheet metal, suitable for suspension in water to keep the bait alive; and (b) a collapsible construction whereby it may be reducible to compact form suitable for convenient transportation and storage.

The structure, and its merits, will be fully set forth in the following specification; reference being made to the accompanying drawings for illustration of the description, in which drawings:

Fig. 1 is a perspective view of my improved box; Fig. 2 is a sectional plan view thereof, being taken as indicated by the line 2—2 of Fig. 1; Fig. 3 is a perspective view showing the collapsible features of the box; Fig. 4 is an enlarged detailed fragmentary section, taken as indicated by the line 4—4 of Fig. 3; and Fig. 5 is a similar section, taken as indicated by the line 5—5 of Fig. 3.

Referring now to the drawings, the numeral 10 designates generally a base receptacle of any size and shape desired. It is preferably square in plan, open at its top, and consisting of a bottom 11 and sides 12 and 13. It is best constructed of sheet metal, preferably galvanized iron, both to provide lightness combined with strength and rigidity, and to withstand suspension in sea-water without deterioration. The joints may be either soldered or riveted, as desired; and the walls 12 and 13 may be provided with windows or openings 14 covered with screening 15, although this is not necessary to this part of the structure. The windows 14 are for the free admission of water to the interior; and it is obvious that other types of openings may be provided, such as perforations, or the windows 14 may be left out entirely, sufficient water entering through the top. It may be desirable to eliminate all openings from the walls 12 and 13 so that when the box is raised out of the water to withdraw bait from the interior, the water will not all drain out. In any event it is desirable that the bottom portion of the base receptacle be imperforate so that it will contain a certain amount of water at all times.

The top edges of the walls 13 are bent outwardly at right angles and again bent underneath to form outwardly extending flanges 16; and in a like manner the tops of the walls 12 are bent outwardly coplanar with the top faces of the flanges 16, but instead of these flanges being bent underneath, as in the case of the flanges 16, they are bent upwardly and inwardly in a return bend to form flanges 17 having channels 18, to the functions of which I will presently advert. Flanges 16 and 17 are joined along diagonal lines at their junctures, to form a continuous plane surface around the top of the container 10; above which flange portions 17ª extend over the channels 18. The channels 18 are open on their inner sides and closed on their outer sides by the return bends of the flange. In addition to the utility of the flanges 17 in forming the channels 18, both these flanges and the flanges 16 are formed as described to give strength and rigidity to the container 10, as well as to support removable extension walls, to be now described.

The bait container 10 is made extensible by the attachment of removable side wall sections 19 and 20; provided in identical pairs and adapted to be removably secured to the container 10 in opposed relation, as illustrated in Fig. 3. These wall sections may be of any height desired, and conform in length to the lengths of their complementary side walls 12 and 13 of the container 10. Preferably each of these wall sections is provided with window openings 21 covered by suitable screening 22, to admit water to the interior of the box when they are attached. Under ordinary circumstances, if desired, the window openings 14 in the container 10 may be eliminated entirely, and the window openings 21 depended upon to admit water to the interior of the box. In such case when the box is removed from the water excess water will drain outwardly through the openings 21, leaving the container 10 filled sufficiently to cover the live bait therein.

The wall sections 19 are adapted to be removably secured to the container 10, at the tops of the walls 12; being constructed of single pieces of sheet metal, and having right angular flanges 23 (preferably of a single thickness of material) extending outwardly from their bottom edges 24; these flanges being adapted to engage in the channels 18, between the flange portions 17 and 17ª, as clearly illustrated in Fig. 4. The flange 23 is of such width that it will engage the back of channel 18 and hold the wall portions 24 in the planes of the walls 12. Right angular flanges 25 are formed to extend outwardly from the top edges of the wall sections 24; these flanges being formed in the manner of the flanges 16 (with a return bend underneath) to give strength and rigidity to this portion of the walls and also provide suitable surfaces for supporting a top or cover 26. It is to be noted that the end edges of the flanges 23 and 25 are cut on diagonal lines to abut against and form reasonably close junctures with similar flanges on the wall sections 20. Right angular flanges are formed on the vertical end edges of the wall sections 19, by bending the material inwardly as shown in Fig. 3.

The wall sections 20, attachable on the flanges 16 of the walls 13, are similar to the wall sections 19; having identical flanges 28 formed on their top edges and flanges 29 formed along their bottom edges. Flanges 29 differ from the flanges 23 in that the former are formed by bending the material of the wall sections 30 outwardly at right angles and again inwardly in a return bend, and thence again downwardly at right angles to the flange and in a plane parallel with but slightly inward of the wall portion 30, as clearly illustrated in Fig. 3. Flanges 28 and 29 are spaced the same distance apart as flanges 23 and 25, so that when the wall sections 19 and 20 are mounted upon the container 10, these flanges will all be coplanar. The wall sections 20 are supported upon walls 13 by the flanges 29 resting upon the top surface of flanges 16, with the flanges or aprons 31 extending downwardly over their inner faces as clearly illustrated in Fig. 5. The end edges of the flanges 28 and 29 are likewise cut along diagonal lines to abut against the diagonal ends of the flanges 23 and 25 when all are adjusted to the container 10.

Thus the engagement of flanges 23, of wall sections 19, in the channels 18 prevent outward displacement of these sections; while engagement of the aprons 31 with the inner faces of the walls 13 prevent outward movement of the wall sections 20 when the flanges 29 are resting upon the flanges 16.

Vertically disposed outwardly opening channels 32 are formed along the end edges 33, of the wall sections 20, by bending the material inwardly upon itself and back again in a return bend 34, providing these channels for the reception of the flanges 27 upon contiguous ends of the wall sections 19. This phase of the construction is clearly illustrated in Fig. 2, where the wall sections are shown in place upon the tops of the walls 12 and 13 of the container 10.

Thus engagement of the flanges 27 in the channels 32 prevents outward displacement of the top edges of the wall sections 20 when in place. This engagement of flanges 27 in channels 32 likewise prevents inward displacement of the flanges 23 from the channels 18 as well as inward movement of the bottoms of the wall sections 20. Also, the return bent portions 34 of the channels 32 may be bent to so frictionally engage the flange 27 that they will not become accidentally disengaged. Thus the wall sections 19 and 20 are so mounted upon the top of the container 10, and interengaged, that their accidental displacement is impossible, except that the top edges of the sections 19 may be displaced outwardly and this is taken care of in the following manner.

The top or cover 26 is of an over-all size to conform to the outer edges of the flanges 25 and 28; and it has a downwardly extending marginal flange 35 on its under surface, spaced slightly inward from its perimeter to fit fairly closely within the wall sections 19 and 20 when the latter are in place upon the container, as shown in Fig. 4. The cover 26 has holes 36 extending through it on opposite sides, intermediate the flange 35 and its outer edge. These holes are positioned to register with similar holes 37, extending through the flanges 25 of the wall sections 19, so that wire hooks 38 may be extended through both of them to not only hold the cover 26 in place upon the flanges 25 and 28, but to also secure the top edges of the wall sections 19 against outward displacement when the box is suspended in water. The hooks 38 may be formed of wire, and may be of any suitable configuration to prevent their becoming easily disengaged from the holes 36 and 37; and they may also be joined to a common supporting link 39 by means of chain sections 40. Swivel connections 41 may be interposed between the chain sections 40 and the hooks 38 to permit easy disengagement of the latter from the registering holes 36 and 37.

Holes 42 also extend through the flanges 16, in relative position to register with holes 36, to permit the cover 26 being secured to the container 10, in the manner just described. Thus the container 10, without the extensible wall sections 19 and 20, may be used; or, when the box is not being used to contain bait, the wall sections 19 and 20 may be removed and placed in the container 10, after which the top 26 may be secured thereto in the manner just described.

Preferably the cover 26 has quite a large aperture or hand hole 43 cut in its center, and a smaller cover 44 pivotally secured to the cover 26 (see Fig. 1) by means of a rivet 45, to slide over this aperture. The cover 44 may be opened or closed by means of a small button or pin 46; and it may be held in closed position by engagement of its edge under a small spring clip 47, likewise secured to the cover 26. Thus when it is desired to remove bait from the box it is only necessary to slide the cover 44 in the direction indicated by the arrow in Fig. 1, to uncover the aperture 43.

From the foregoing description the advantages and uses of my improved box are obvious. It is clear how the bait container 10 may be made extensible and of greater capacity merely by adding the wall sections 19 and 20; and it may be here noted that any number of the wall sections 19 and 20 may be utilized, merely by formation of suitable flanges upon their top edges. The container 10 may be made extensible in a few moments' time by adding the wall sections 19 and 20 without the use of additional or extraneous securing means. When the box is collapsed for transportation or storage the wall sections 19 and 20 may be removed and placed in the container 10 and the top 26 secured on top of the flanges 16 and 17, as hereinbefore described.

Having described a preferred form of my invention, I claim:

1. A device of the class described comprising a base container open at its top, separable extension walls removably secured to the top of said base container, a cover supported by said extension walls, and means to interlock said walls together and to the base container, and the top to said walls to prevent their relative displacement.

2. A device of the class described comprising a base container open at its top, separable extension walls removably secured together and to said base container, and means to interlock said extension walls to prevent their relative displacement.

3. A device of the class described comprising a base container having side walls and open at its top, extension walls removably secured to said base container, and means to interlock said extension walls to prevent their displacement, said means comprising flanges along the bottom edges of said walls to engage the top edges of said base container, and interlocking flanges and channels along the contiguous vertical edges of said extension walls.

4. A device of the class described comprising a base container having side walls and open at its top, extension walls removably secured to the walls of said base container, and means to interlock said extension walls to prevent their displacement, said means comprising channels along the top edges of opposite side walls of said container, and flanges along the bottom edges of their complementary extension walls to engage in said channels, flanges along the bottom edges of the other extension walls to engage the top edges of the other opposite walls of said container, and complementary flanges and channels along the contiguous vertical edges of said extension walls.

5. A device of the class described comprising a base container having side walls and open at its top, extension walls removably secured to the tops of the walls of the base container, and means to interlock said extension walls to prevent their displacement, said means comprising inwardly opening channels along the top edges of opposite side walls of said container, and outwardly extending flanges along the bottom edges of their complementary extension walls, to engage in said channels, right angular flanges along the bottom edges of the other extension walls to engage the top edges and inner faces of the other container walls, and complementary flanges and channels along the contiguous vertical end edges of said extension walls.

In witness that I claim the foregoing I have hereunto subscribed my name this 17 day of Feb., 1922.

FREDERICK F. EVERMANN.